United States Patent
Grudnoff et al.

[11] Patent Number: 5,651,952
[45] Date of Patent: Jul. 29, 1997

[54] PROCESS FOR THE PRODUCTION OF LITHARGE (PBO)

[75] Inventors: Ronald Colin Grudnoff, Dora Creek; Mark Ian Hoschke, Newcastle, both of Australia

[73] Assignee: Pasminco Australia Limited, Melbourne, Australia

[21] Appl. No.: 481,517

[22] PCT Filed: Aug. 23, 1994

[86] PCT No.: PCT/AU94/00490

§ 371 Date: Sep. 11, 1995

§ 102(e) Date: Sep. 11, 1995

[87] PCT Pub. No.: WO95/10482

PCT Pub. Date: Apr. 20, 1995

[30] Foreign Application Priority Data

Oct. 11, 1993 [AU] Australia ................ PM1739

[51] Int. Cl.$^6$ ........................................... C01G 21/02
[52] U.S. Cl. ................................................... 423/621
[58] Field of Search ....................................... 423/621

[56] References Cited

U.S. PATENT DOCUMENTS

| | | | |
|---|---|---|---|
| 1,770,777 | 7/1930 | Haynes | 423/621 |
| 1,779,003 | 10/1930 | Knapp et al. | 423/621 |
| 3,836,339 | 9/1974 | Lesbros et al. | 423/621 |
| 4,521,399 | 6/1985 | McKinney | 423/621 |

FOREIGN PATENT DOCUMENTS

| | | | |
|---|---|---|---|
| 12895 | 7/1891 | United Kingdom | 423/621 |
| 16276 | 7/1896 | United Kingdom | 423/621 |

*Primary Examiner*—Steven Bos
*Attorney, Agent, or Firm*—Dennison, Meserole, Pollack & Scheiner

[57] ABSTRACT

A process for the production of litharge in which molten lead is reacted with oxygen at a temperature above the melting point of litharge. According to the invention, oxygen is injected into a bath containing molten lead such that the velocity of the injected gas as it expands into the bath is at least Mach 1. In order to minimize corrosion of the reaction vessel, the walls of the vessel are preferably composed of a heat conductive material and externally cooled, whereby heat is withdrawn from the internal surface to keep the surface temperature below the melting point of litharge, and more preferably below the melting point of lead.

6 Claims, 1 Drawing Sheet

PROCESS FOR THE PRODUCTION OF LITHARGE (PBO)

FIELD OF THE INVENTION

This invention relates to a process and apparatus for the production of litharge (lead monoxide, PbO).

In one aspect the invention provides a process for the production of litharge, in which molten lead is reacted with oxygen at a temperature above the melting point of litharge, whereby litharge is formed as a liquid product which may be continuously withdrawn from the reaction vessel. The invention also provides an apparatus in which the process my be successfully carried out. In its preferred embodiments the process of the invention enables the production of high purity litharge in a convenient, cost-effective and environmentally favourable manner.

BACKGROUND OF THE INVENTION

Litharge is an important article of commerce, used on a large scale in a number of industrial manufacturing processes. In the manufacture of glass, high purity litharge, for example containing less than 0.01% lead, is required.

Molten litharge is extremely corrosive and molten lead is capable of dissolving many metals. Prior to the present invention, no material has been found that could withstand the hostile environment of molten lead and molten litharge at the elevated temperatures encountered in this reaction. Control of the reaction also posed a difficult problem as the oxidation of lead at elevated temperatures is extremely rapid and highly exothermic, like a flame. The temperature in the flame may reach up to 1700° C. All previous attempts to produce molten litharge by oxidation of molten lead have been defeated by this corrosivity, which is destructive of conventional refractory furnace linings. Furthermore, a pure product could not be obtained, due to contamination by components of the failed refractory.

Litharge of sufficiently high purity for use in the glass industry has previously been manufactured by the Barton pot process. In this process, lead is melted and fed to the Barton pot where it is agitated and contacted with air at 450° to 550° C. In the Barton pot, the pool of molten lead is stirred by high speed blades. This throws up droplets which are oxidised by the air, but the oxidation is incomplete. The solid powder product, containing from about 70% to 99% PbO, is entrained in the air stream while the heavier lead droplets fall back into the pool. The powder product is separated by filtering the air stream from the Barton pot, typically using a baghouse. Handling of the dusty powder leads to environmental problems. The powder product is then calcined in a separate reactor, if necessary, to produce a solid product containing at least 99% PbO, which is fed to a melting furnace. In the melting furnace, most of the final traces of lead are oxidised and the product is then granulated to produce litharge of purity of 99.9%+.

The Barton pot process is limited by the requirement for multiple steps, involving an expensive train of equipment, and also by the fact that the maximum size of a Barton pot is limited, which frequently creates the need for a number of Barton pots to achieve a desired production level. The Barton pot process and other prior art processes are described in "LEAD OXIDES—Chemistry—Technology Battery Manufacturing Uses—History" (1974), Independent Battery Manufacturers Association, Inc., Florida USA, at pages 21 to 25. Reference is made to Barton's U.S. Pat. Nos. 988,963 (1911) and 1,060,153 (1913), Pope and Barton U.S. Pat. No. 633,533 (1899), Mayer 2,235,487 (1941), and Vahernkamp et al 3,322,496 (1967).

In describing a "fused litharge furnace" with reference to Hughes U.S. Pat. No. 975,955 (1910) and Petraeus U.S. Pat. No. 592,594 (1897), which is said to be "now mainly of historical interest" this book comments that "A mixed bath of lead and litharge at about 1000° C. has almost fantastic corrosive and erosive properties" which has caused major problems.

The book also describes the "fume type process", which produced a "smoke" from which a product of fine particle size was recovered in a baghouse. (Calbeck U.S. Pat. No. 1,511,215 (1924) and Garesche U.S. Pat. No. 2,065,218 (1936)).

SUMMARY OF THE INVENTION

In contrast to the prior art, the present invention provides a process capable of being carried out continuously in a single reactor, thus giving important advantages in economy and flexibility of operation.

The process of the invention essentially comprises reacting molten lead with oxygen at a temperature above the melting point of litharge, whereby litharge is formed as a liquid product. In a preferred embodiment oxygen is injected into a bath containing molten lead, typically at about 1000° C., in such manner that the velocity of the injected oxygen as it expands into the bath is at least Mach 1 and preferably at least Mach 1.25. Preferably the oxygen used contains at least 95% $O_2$, more preferably at least 99.7% $O_2$ and most preferably at least 99.9% $O_2$. By "Mach 1", as will be clearly understood in the art, we mean the speed of sound in the gas concerned.

The reaction vessel needs to be constructed of a material which can contain the litharge/lead bath, and also cope with the high heat flux from the bath. The use of a vessel with cooled walls of good thermal conductivity allows both of these functions to be performed. In order to prevent attack by liquid litharge, the interior hot surface of the vessel wall must be kept below the melting point of litharge, and preferably also below the melting point of lead to prevent attack by molten lead, although this is less destructive than molten litharge. Copper is the preferred metal for the reactor and tuyere due to its high heat conductivity. Other metals may be suitable, but it is expected that they would be either too expensive for example silver, or less effective, for example steels. In the preferred embodiment of the present invention, the copper vessel is cooled by water sprays acting in an enclosure which is open to the atmosphere, thus avoiding a risk of explosion which might occur in a reactor utilising an enclosed water jacket. Obviously coolants other than water could be used to good effect. In the preferred embodiment the vessel has a high ratio of external (cooled) surface area to internal (hot) surface area. This reduces the heat flux to the cooling water, and enables a simpler design of water sprays.

The compact, continuous single step process offers significant reduction in both capital and operating cost, compared to the prior art.

Although we do not wish to be limited by any hypothetical or postulated mechanism for the observed advantages of this process, it is believed that the reaction vessel becomes protected from the hostile environment by a layer of frozen litharge. Furthermore, it is found in practice that the bath is quiescent and the injected oxygen appears to be totally consumed. As there is no process off-gas and practically no dust/fume formation, the process has a very low environmental impact.

DESCRIPTION OF THE PREFERRED EMBODIMENT

Figure 1:
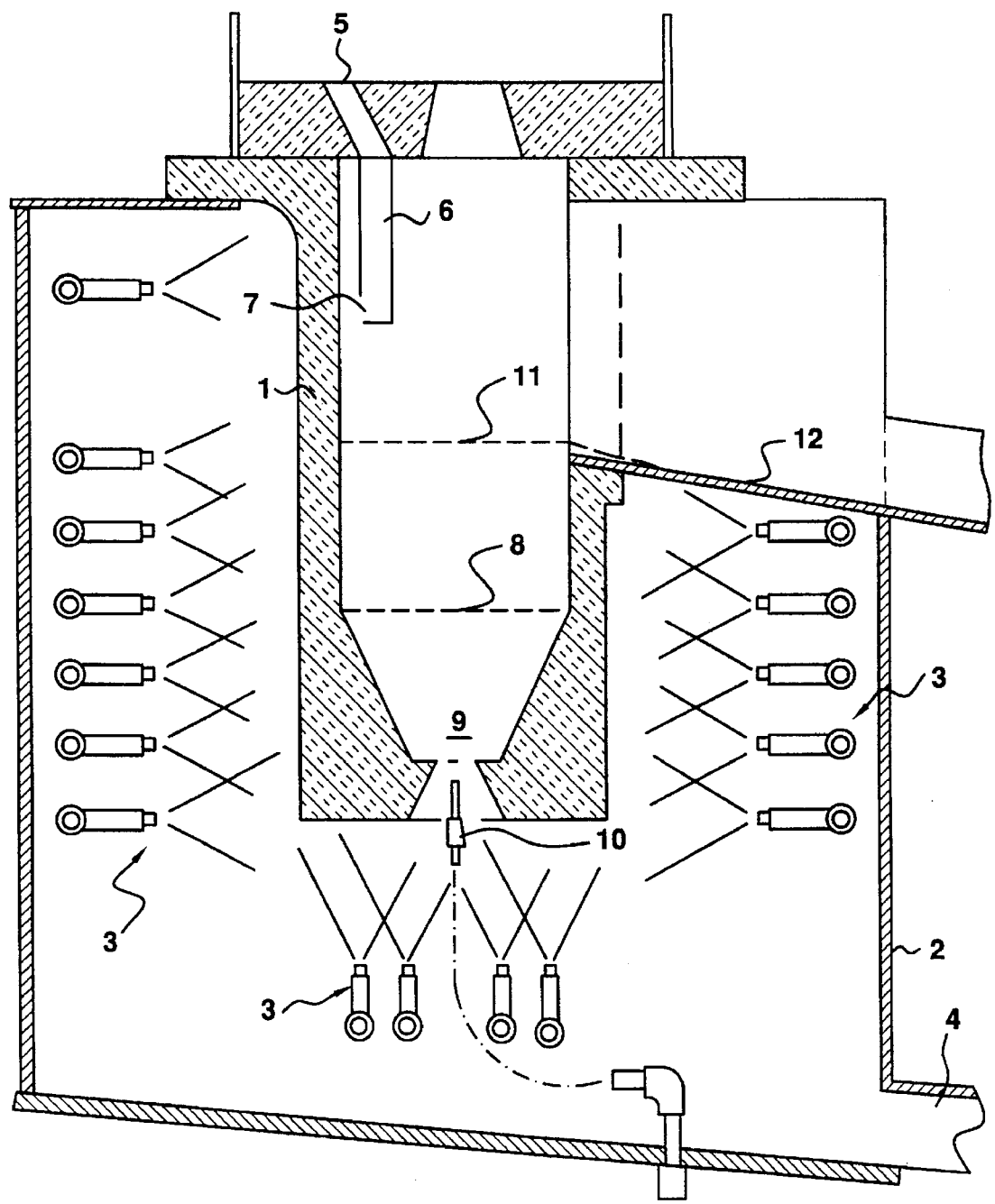
FIG. 1 is a cross-sectional view of an apparatus for performing the process of the invention.

In the preferred embodiment illustrated in FIG. 1, a copper vessel 1 is located in an enclosure 2 and surrounded by an array of water sprays 3 fed by ring mains not shown, the cooling water during operation exiting the apparatus via drain 4. The entire apparatus is mounted in known manner not shown, so as to be tiltable about a horizontal axis, whereby the liquid contents may be poured out, enabling the apparatus to be shut down without solidification of the contents within the reaction vessel.

One method of starting up the process will be described below.

In operation, molten lead entering at 5 descends through a pipe 6 and exits against the wall of the reactor at 7. Oxygen is injected into the bath at 9 through a tuyere 10, at a velocity sufficient to maintain a flame zone at a distance from the tuyere, thus minimising back attack by the highly corrosive components of the bath. As the bath is maintained at a temperature above the melting point of litharge, the entire bath is in the liquid phase and litharge produced by the oxidation reaction, being of lower density than molten lead, rises to the top of the bath and is drawn off at 11.

The internal bottom section 8 of the bath is conically shaped, which facilitates cooling by reducing the ratio of the inner surface to the outer (cooled) surface in this section. Oxygen is introduced at 9 through a water cooled tuyere 10 and reacts with the molten lead in a flame zone above the inlet tip. By maintaining supersonic velocity of the oxygen stream as it expands into the bath, back attack on the tuyere tip is avoided, indicating that intermittent collapse of the flame zone which apparently occurs at lower inlet velocities has been avoided.

Oxygen was supplied at 3500 Kpa from bottles. The tuyere is fabricated of copper with a separate pressurised water cooling jacket. It was found to operate successfully at low temperature (below 150° C.) and erosion of the tuyere was minimised by adjusting the oxygen flow rate so that the velocity of the gas jet expanding into the bath was at least Mach 1.25.

In operation the bath is quiescent, indicating that all of the oxygen is consumed. Litharge formed in the oxidation reaction floats upward and overflows at 11 into launder 12 as product.

Litharge granules may be obtained from the molten product by shock chilling the liquid.

Control of the reaction in this apparatus is not difficult. Temperature was found to be reasonably self-regulating, in that heat loss increases when temperature increases. The rate of oxygen supply was adjusted manually to achieve the required supersonic speed, preferably at least Mach 1.25, as the oxygen expands into the bath. Lead level in the bath was controlled by the rate of lead feed.

The litharge product contained less than 0.01% free lead, and negligible contamination by copper, iron, chromium or nickel, indicating the there is no significant corrosion of the reaction vessel.

STARTING UP

In one method of starting up, the reaction vessel was lined with a sacrificial lining of approximately 15 mm refractory in the conical section. Lead was heated to 1200° C. in a crucible in an induction furnace, poured into a refractory lined steel pot and transferred to the front of the reactor, where it was reheated to 1200° C. using a small top blown tuyere. This saturates the molten lead with oxygen, which appears to facilitate the formation of a stable litharge coating on the reactor wall, whereas an unsaturated charge appears to form unstable metallic coatings with excessive heat flux to the reactor walls. With oxygen running through the tuyere in the base of the reactor, the hot lead was poured into the reactor, whereupon the exothermic oxidation reaction commenced, and a liquid bath was established. The initial overflow product was discarded due to impurities. Heat transfer data indicated that the sacrificial lining was consumed in about 10 to 20 minutes and a steady state reaction was established. As an alternative to the sacrificial lining the reactor may also be started with a natural litharge lining.

It will be clearly understood that the invention in its general aspects is not limited to the specific details referred to hereinabove.

What is claimed is:

1. A process for the production of litharge by reacting molten lead with oxygen in a reaction vessel, comprising the steps of:

injecting a gas containing at least 95% oxygen into a bath containing the molten lead in the reaction vessel at a temperature above the melting temperature of litharge, said gas being injected such that said gas expands into the bath at a velocity of at least Mach 1, litharge thereby being formed as a liquid product which rises above the molten lead in the bath; and withdrawing the litharge formed from the bath.

2. Process according to claim 1 in which the gas contains at least 99.7% $O_2$.

3. Process according to claim 2 in which the gas contains at least 99.9% $O_2$.

4. Process according to claim 2, in which said reaction vessel has an interior surface in contact with the bath which is maintained at a temperature below the melting temperature of litharge.

5. Process according to claim 4, in which the interior surface is maintained at a temperature below the melting temperature of lead.

6. Process according to claim 1 in which the velocity is at least Mach 1.25.

* * * * *